United States Patent [19]

Bleeg

[11] Patent Number: 5,375,794
[45] Date of Patent: Dec. 27, 1994

[54] APPARATUS AND METHOD FOR REDUCING AIRCRAFT LOADS RESULTING FROM ATMOSPHERIC TURBULENCE AND GUSTS

[75] Inventor: Robert J. Bleeg, Mercer Island, Wash.

[73] Assignee: The Boeing Company, Seattle, Wash.

[21] Appl. No.: 884,581

[22] Filed: May 18, 1992

Related U.S. Application Data

[63] Continuation of Ser. No. 587,141, Sep. 24, 1990, abandoned.

[51] Int. Cl.$^5$ ............................................. B64C 13/16
[52] U.S. Cl. ................................. 244/76 C; 244/195; 364/434
[58] Field of Search ................. 244/76 C, 184, 194, 244/195, 203, 90 B; 364/433, 434

[56] References Cited

U.S. PATENT DOCUMENTS

| | | | |
|---|---|---|---|
| 2,238,403 | 4/1941 | Soderquist et al. | |
| 2,368,059 | 1/1945 | White | 244/203 |
| 2,492,252 | 12/1949 | Wing | |
| 2,743,889 | 5/1956 | White | |
| 2,832,551 | 4/1958 | Gille | |
| 2,962,243 | 1/1960 | Coleman et al. | |
| 3,848,172 | 11/1974 | Thomas | |
| 4,094,479 | 6/1978 | Kennedy | 244/184 |
| 4,213,584 | 7/1980 | Tefft et al. | |
| 4,227,662 | 10/1980 | Fisher et al. | 244/76 C |
| 4,591,113 | 5/1986 | Mabey | 244/76 C |
| 4,814,764 | 3/1989 | Middleton | |
| 4,932,611 | 6/1990 | Horikawa | 244/203 |

FOREIGN PATENT DOCUMENTS 937046 9/1963 United Kingdom ............... 244/203

Primary Examiner—Galen L. Barefoot
Attorney, Agent, or Firm—Robert H. Sproule

[57] ABSTRACT

A controller for reducing unwanted sideways motion of an aircraft by reducing lateral side loads, resulting from air mass, turbulence and gusts. The controller functions in a manner that in the presence of higher frequency side loads, the rudder is caused to move in a relieving direction so that the net force across the vertical stabilizer is reduced. A pressure differential across opposite sides of the vertical stabilizer is measured and used to generate a first rudder deflection signal. To maintain stability of the aircraft, a beta-dot signal from the yaw damper module is gain adjusted and filtered to generate a second rudder deflection signal which is added to the first rudder deflection signal. The resulting combined signal reduces lateral side loads at higher frequencies without comprising aircraft directional stability.

10 Claims, 2 Drawing Sheets

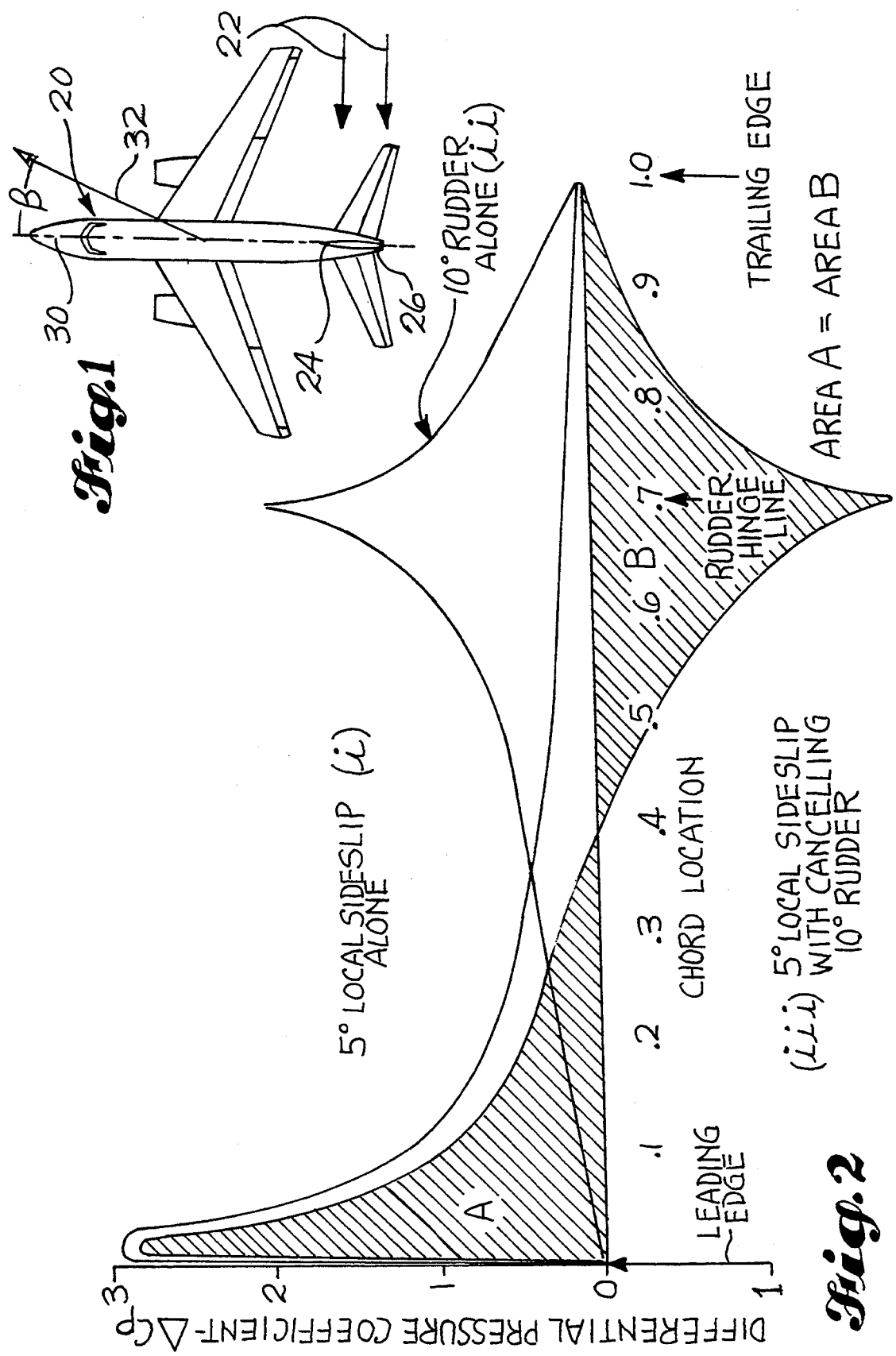

APPARATUS AND METHOD FOR REDUCING AIRCRAFT LOADS RESULTING FROM ATMOSPHERIC TURBULENCE AND GUSTS

This is a continuation of application Ser. No. 07/587,141 filed Sep. 24, 1990.

TECHNICAL FIELD

The present invention pertains to a controller for reducing aircraft loads resulting from atmospheric turbulence and gusts, and more specifically to a controller for reducing aircraft aft body loads and sideways aircraft movement due to in-flight gusts and turbulence.

BACKGROUND OF THE INVENTION

The passenger lateral ride quality (rapid and short sideways motion) in the aft cabin of commercial jet transports is widely recognized as uncomfortable in conditions of atmospheric turbulence and gust. This is especially true of aircraft without aft-mounted engines which may significantly mitigate the effect of turbulence and gust. For long-bodied aircraft, the problem is ,even worse because the amplitudes of structural oscillations are comparatively higher for these aircraft.

It is known that these lateral gust loads react along the length of the aircraft fuselage. However, the aircraft's vertical fin (tail), due to its size, is the principal portion of the aircraft upon which the lateral gust loads react.

Numerous attempts have been made in the past to improve aircraft ride quality. These attempts sometimes featured the use of rate gyros and accelerometers to measure aft body motion (often relative to mid-body motion) and to command a corrective rudder control surface displacement. In addition, a number of conventional devices for reducing air loads have been disclosed. For example, U.S. Pat. No. 2,492,252 by Wing discloses a controller for automatically adjusting aircraft rudder trim in order to compensate for a change in power output of the aircraft's engines as a function of a measured pressure differential between the propeller slipsteam and aircraft airstream. Furthermore, U.S. Pat. No. 2,832,551 by Gille discloses a dirigible flight control system which dampens the oscillations of the dirigible's tail section relative to the front section in a manner that the rudder surface is moved to oppose the gusts which cause the tail section to oscillate.

A problem with these conventional techniques is that they do not apply corrective action until the unwanted motion already has been initiated.

SUMMARY OF THE INVENTION

The present invention pertains to a control system for reducing aft body side loads on an aircraft. The control system includes means, such as pressure sensors mounted on the aircraft vertical stabilizer, for sensing side forces on the vertical stabilizer. In addition, there are means for generating a rudder command signal as a function of the side forces so as to move the rudder in a relieving direction so as to reduce the side forces. Also provided are means, which are responsive to the rudder command signal, for moving the aircraft rudder.

BRIEF DESCRIPTION OF THE DRAWINGS

The present invention will be described in greater detail in the following Detailed Description in conjunction with the attached drawings, in which:

FIG. 1 is a plan view of a conventional aircraft;

FIG. 2 is a graph of an airfoil (NACA 0009 in incompressible flow) differential pressure coefficient as a function of chord location when (i) ten degrees of rudder are applied, (ii) there are five degrees of sideslip angle, and (iii) when ten degrees of cancelling rudder are applied in the presence of five degrees of sideslip angle.

DETAILED DESCRIPTION

Figure 3:
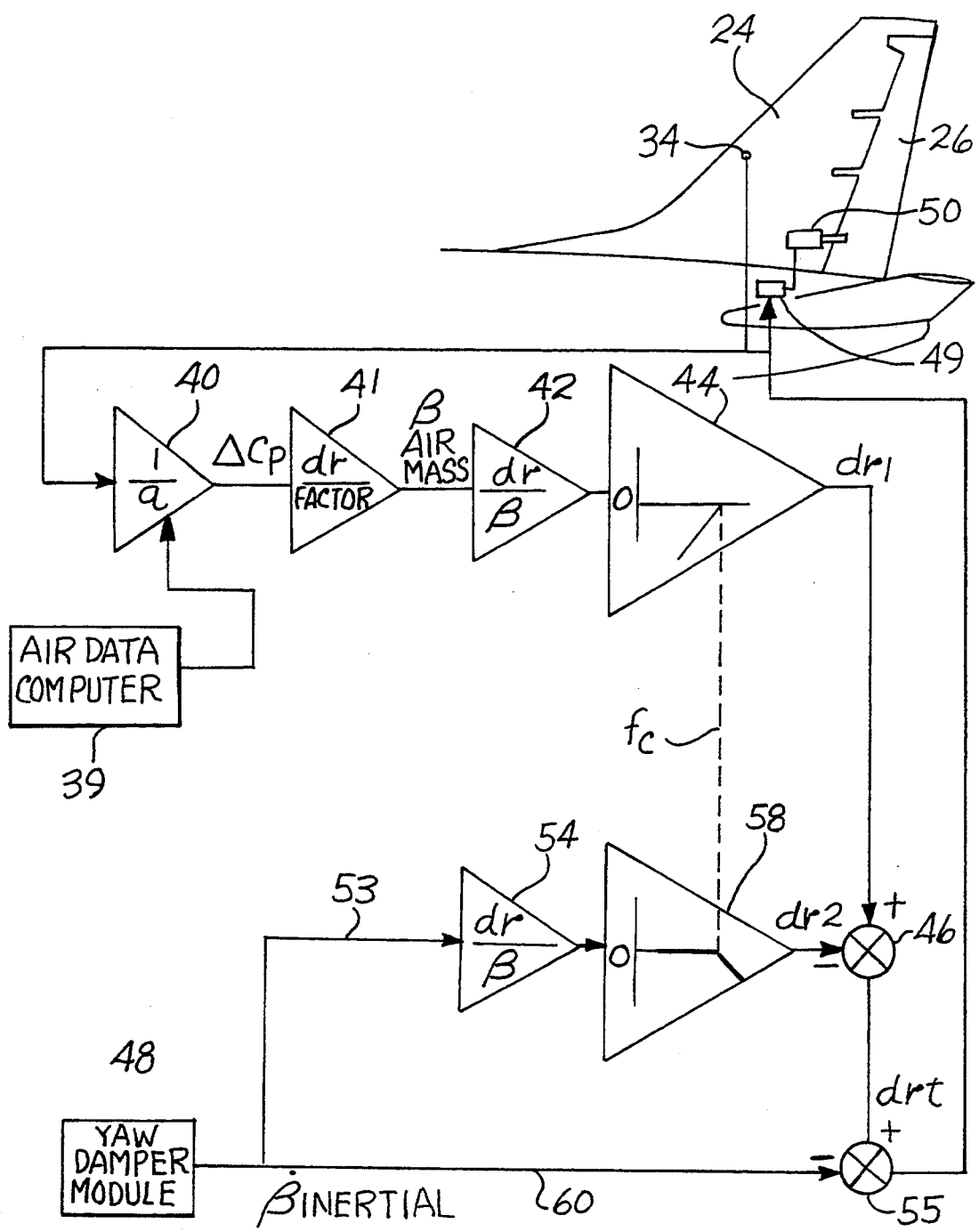
FIG. 3 is a simplified block diagram of the control system of the present invention.

The present invention pertains to a controller for reducing unwanted movement of an aircraft due to gusts and turbulence. In an exemplary embodiment, the invention will be described for use in reducing lateral movement of the aircraft by commanding a cancelling rudder position. However, it should be appreciated that the scope of the present invention is not limited to the exemplary embodiment described below.

The present embodiment overcomes the disadvantages of conventional controllers by using a unique method for sensing the amount of corrective rudder displacement required to counter the effects of turbulence and gusts. More specifically, the sideways lift generated by the vertical stabilizer is sensed and a proportionate rudder command in the relieving direction is generated in order to reduce any net forces being reacted on the fuselage structure. In the present embodiment, vertical stabilizer lift (due to sideslip) is sensed by means of a differential pressure transducer connected to flush mounted pressure ports located on opposite sides of the vertical stabilizer. However, it should be appreciated that there are other means of detecting sideslip angle (e.g., a vane on a probe located ahead of the stabilizer) and that these means may be equally applicable to the present invention.

Referring first to FIG. 1 there is shown a conventional aircraft indicated at 20 which is subject to gusts and turbulence which generate lateral sideload forces shown by arrows identified by the numbers 22. The aircraft 20 includes a vertical stabilizer 24 over which a majority of the lateral sideload forces react, and a rudder 26. It is an object of the present invention that for sideloads of relative higher frequencies, i.e., those greater than about one radian per second, that the vertical stabilizer substantially "disappears". Analysis has shown that if the side forces on the vertical stabilizer are "removed" (at frequencies greater than or equal to one radian per second), the total lateral acceleration at the aft bulkhead of the airplane is reduced by about eighty percent. It should be noted that the present system does not replace the function of a conventional yaw damper which is present on the airplane.

It should be appreciated that it is not practical to figuratively "remove" the vertical stabilizer because of the consequent detrimental effect on the directional stability of the airplane. More specifically, without the vertical stabilizer the presence of a wind from a direction other than directly head-on could cause the sideslip angle of the aircraft to steadily increase until it is possible for the aircraft to literally "swap ends" so that it is traveling tail first. Therefore, an object of the present invention is to retain static stability and handling qualities while reducing the side excess forces which result from the higher frequency gust disturbances.

In the present invention, this so-called "removal" of the vertical fin is accomplished by movement the rudder in a relieving direction, in response to a gust, so that little lift is generated by the vertical fin. For example, if a side load is generated on the aircraft in a right-to-left direction (when viewing FIG. 1), movement of the trailing edge of the rudder 26 by a proper amount to the left, i.e., the relieving direction, counteracts this side load so that the net force reacting on the vertical stabilizer is reduced.

By definition, aircraft sideslip angle beta shown in FIG. 1 is the angle between the longitudinal axis of the aircraft shown by a dashed line identified by a number 30, and the direction of flight of the aircraft shown by an arrow identified by the number 32. It is known for a conventional airplane configuration (NACA 0009 airfoil section with a thirty percent chord rudder in incompressible flow) that when the rudder is moved approximately two degrees in the relieving direction for every one degree of sideslip angle, there will be no net side force reacting on the vertical stabilizer.

The total side force on the vertical stabilizer is a function of the chordwise and spanwise pressure distribution. For a constant sideslip angle, the maximum pressure differential occurs somewhat ahead of the ten percent chord position (for the specific example of an NACA 0009 airfoil in incompressible flow). The pressure change in response to rudder deflections is centered around the rudder hinge line at about the seventy percent chord location with little effect at the ten percent chord location. This is shown more clearly by the graph in FIG. 2 wherein the differential pressure coefficient delta $C_p$ (which is equal to actual pressure divided by dynamic pressure), is a function of the chord location for (i) five degrees of aircraft sideslip, (ii) ten degrees of rudder input and (iii) five degrees of aircraft sideslip with ten degrees of cancelling rudder. It can be seen that ten degrees of cancelling rudder effectively neutralizes the differential pressure generated at the rudder hinge line by five degrees of aircraft sideslip (i.e., Area A=Area B).

In the present invention, a conventional differential pressure sensor 34 is installed across opposite surfaces of the vertical stabilizer at approximately the ten percent chord line. A spanwise location which is approximately one half of the stabilizer span distance from the fuselage intersection is chosen to minimize fuselage interference and tip vortex effects. As the rudder is moved in the relieving direction, there is very little change in the pressure differential at the ten percent chord location. This provides for accurate implementation of the present invention since the corrective movement of the rudder does not overwhelmingly affect the pressure differential being sensed.

Conventionally, accelerometers have been used to sense lateral side loads. A disadvantage of using accelerometers is that there must be actual lateral motion/acceleration of the aircraft before the side loads are sensed. Consequently, an infinitely high gain (which is a practical impossibility from many standpoints) would have to be used to achieve full cancellation. In the present invention, pressures at the vertical stabilizer are sensed. This allows the controller to take corrective action (with a relatively low gain) before any yawing movement of the aircraft has begun.

The amount of relieving rudder movement is also a function of the aircraft airspeed. For example, as airspeed increases for a constant rudder angle, a greater force is exerted by the rudder about the yaw axis. In the present invention, a pressure differential signal (delta P) is generated by the sensor 34 (FIG. 3) and fed through an airspeed gain compensation amplifier 40 wherein the gain is decreased as the variable q increases. In the present invention, q is a function of the air density and the square of the aircraft velocity. Air density and aircraft velocity are obtained from a conventional aircraft air data computer 39. In this manner, a pressure differential coefficient (delta $C_p$) is obtained which is independent of airspeed.

A rudder compensation factor consisting of a gain slightly greater than one is applied to delta $C_p$ by an amplifier 41 (FIG. 3) in order to account for the slight reduction in sensed pressure due to relieving rudder displacement. Therefore the output of amplifier 41 is a close approximation of airmass sideslip angle (beta$_{airmass}$). In turn, this beta-airmass signal is amplified by an amplifier 42 by a ratio which represents the amount of rudder movement $d_r$ (in degrees) for reducing an incremental beta-airmass. Then, in order to cause relieving rudder movement in response to side loads of relatively higher frequencies, e.g., greater than one or two radians per second, the resulting signal ($d_{r1}$) is fed through a high pass filter 44 and then on to an adder 46.

The present invention makes use of an existing beta-dot yaw damper controller to generate a beta-dot signal which is output from a conventional yaw damper module 48 (FIG. 3) on current Boeing 757, 767 and 747–400 airplanes. The existing yaw damper operates conventionally to counteract unwanted yaw oscillation known as Dutch roll. More specifically, beta-dot, which is defined as the rate of change of sideslip angle, is output in a conventional manner from the module 48 to a conventional yaw damper servo 49 which in turn operates a conventional power control unit 50 for moving the rudder 26. The beta-dot signal is conventionally computed using inertial sensor signals of yaw rate, lateral acceleration, and bank angle. Thus, it is commonly referred to as "inertial beta-dot".

An object of the present invention is to reduce gust loads on the aircraft and to retain aircraft normal handling qualities. In order to provide a restabilizing signal to offset the destabilizing signal $d_{r1}$, the conventional beta-dot signal from the yaw damper module 48 is split off at a junction 52 along a path 53. At a gain amplifier 54 the beta-dot signal is multiplied by a rudder sideslip scaling gain which is nominally the same value as the gain used by amplifier 42. Additionally, the gain value is inversely proportional to the break frequencies of filters 44, 58 in order to obtain the proper balance between signals $d_{r1}$ and $dr_2$. Thus the gain at amplifier 54 is selected so as to reduce the $dr_1$ signal at all frequencies under non-turbulent conditions in a manner to be discussed later. In an exemplary embodiment, the gains are achieved in a conventional manner using operational amplifiers.

The resulting signal from amplifier 54 is fed through a low pass filter 58 to attenuate those frequencies above about one radian per second. The resulting rudder deflection signal $d_{r2}$ from the filter 58 provides aircraft stability by making the vertical stabilizer "reappear". The filtered rudder deflection signal $d_{r2}$ is then subtracted from the rudder deflection signal $d_r$ at the adder 46. That is, the stabilization signal $dr_2$ (originated as beta-dot) is combined with the destabilization signal $d_{r1}$ (originated as delta P) so that at all frequencies the stability of the aircraft is maintained. The resulting signal $d_{rt}$ (which is equal to $d_{r1}$–$dr_2$) is added to the beta-dot signal at an adder 55 and then is fed to the yaw damper serve 49 in a conventional manner.

More specifically, the present invention operates so as to reduce any side forces on the vertical stabilizer before there is any yawning movement of the aircraft. This is accomplished in the manner discussed previously by generation of signal $d_{r1}$. Since the aircraft has not moved significantly in a sideways direction, the value of signal $d_{r2}$ as well as the value of signal beta-dot remain small. Thus, signal $d_{r1}$ alone causes rudder movement in the relieving direction. However, in the event the pilot (or autopilot) generates a control signal to move the aircraft about the yaw axis, then signal $d_{r2}$ (from beta-dot-inertial) is generated with a value equal to and opposite that of signal $d_{r1}$. These signals are combined at adder 46 so that they cancel each other, and only the conventional beta-dot-inertial signal along path 60 controls the airplane.

In order to better understand the present invention, the following examples are provided. In the first example an aircraft is flying "straight and level" (in a steady and near-zero sideslip condition) in still air. The aircraft encounters a single short gust which peaks out after half a second and diminishes back to zero a full second after it began. In this situation, the values of $d_{r1}$ and $d_{r2}$ (FIG. 3) are zero until the moment the airplane begins to encounter the gust. In which case the differential pressure transducer immediately outputs a signal proportional to the instantaneous value of the gust. The $d_{r1}$ rudder command signal immediately follows (as the gust frequency content is well within the bandpass of the high pass filter). Finally, the rudder is displaced (in the relieving direction) which results in effective reduction of the vertical stabilizer lift. The rudder displacement time history tracks that of the gust itself (e.g., reaches peak value a half second after the start of the gust and returns to zero a second after it starts). If all this were accomplished perfectly, and if the vertical fin were the only source of side-force on the airplane, then there would be no resultant motion of the airplane and signal $d_{r2}$ would remain at zero throughout the entire gust encounter. However, in practice some of the side force of the gust is reacted by the fuselage, and consequently a comparatively minor side motion develops and beta-dot-inertial has a slight temporary value. Consequently, $d_{r2}$ also has a slight temporary value.

In the second example the aircraft also is flying in still air. The pilot (or autopilot) enters a roll axis maneuver that is intended to result in a temporary departure from a near-zero sideslip in the yaw axis. This causes sideslip to follow much the same time history as the first example. However, beta-dot-inertial "sees" the derivative (rate of change) of the beta time history. As is generally known by those skilled in the art, a low pass filtered beta-dot signal produces the same result as high pass filtered beta-airmass signal. Thus, due to the aforementioned amplifier gain adjustments, $d_{r1}$ and $d_{r2}$ are made equal. They are downstream summed with opposite signs and the net result is zero. In this manner the purposeful maneuvering of the airplane is not affected by the operation of the present invention.

In the present invention the corner frequency ($f_c$) for the filters 44, 58 is selected to be about one radian per second which may be achieved, for example, in a conventional manner by using operational amplifiers. It should be appreciated that the selected value of $f_c$ is a balance between retaining good aircraft handling qualities and maximizing lateral gust load alleviation. That is, maximization of the aircraft handling qualities dictates raising $f_c$ to provide maximum utilization of the vertical stabilizer. However, a lower $f_c$ allows for gust load alleviation at those lower frequencies.

Analysis has shown that it is important to minimize phase angle loss at the higher frequencies (up through first aft body bending mode) for the control path from pressure sensor 34 to the rudder 26 (via elements 40, 41, 42, 44, 46, 54, 49 and 50). High bandwith pressure sensing, computation and actuation are all required to prevent air turbulence from inducing oscillation of the aft body structural mode.

In the present invention, flight tests of a specific application are typically required to establish gain values for amplifiers 41, 42 and 54 (FIG. 3) in order to account for aerodynamic characteristics of the vertical stabilizer, structural windup of the rudder, etc. Strain gauges mounted at the attachment points of the vertical stabilizer (to the fuselage) may be of assistance in establishing/calibrating the total system.

Compensation for the destabilizing feedback of sensed sideslip (beta) into the rudder may be obtained by means other than the use of a low pass filtered beta-dot signal. A combination of roll and yaw rates also may been used. It should also be noted that exact matching of the re-stabilizing signal (beta-dot) to the de-stabilizing signal (beta-airmass) is not required.

It should be understood that the present invention does not replace/displace the function of the conventional yaw damper (which improves the damping of the Dutch Roll mode of rigid body motion found in commercial jet transports. Similarly, structural mode dampers (using accelerometers or rate gyros) may be used with the present invention in order to quickly damp out oscillations which arise out of "imperfect" operation of the present invention. The present invention is intended to prevent the interjection of lateral forces (principally at the vertical stabilizer) and not particularly to damp out the consequences of any forces that may enter the airframe.

It should be appreciated that the present invention is not limited to reducing side loads which react on the vertical stabilizer. Rather, the present invention may be used to reduce unwanted loads that react on any lifting surface by movement of an associated control surface in a relieving direction.

What is claimed is:

1. A control system for reducing aft body sideways loads on an aircraft by operation of an aircraft rudder, the control system comprising:
   a. means for sensing, prior to a yawing movement of the aircraft, side forces on a vertical stabilizer on the aircraft;
   b. means for generating a signal as a function of the sensed side forces so as to command the rudder to move in a direction which reduces the side forces and which does not reduce a sideslip angle of the aircraft; and
   c. means, responsive to the command signal, for moving the aircraft rudder.

2. The control system as set forth in claim 1 wherein the command signal generating means includes:
   a. means for generating a first signal as a function of a sideslip angle which is measured by the sensing means;
   b. means for generating a second signal for correcting aircraft yaw; and c. means for combining the first signal and the second signal to generate the command signal.

3. The control system as set forth in claim 2 wherein the command signal generating means includes:
   a. means for passing higher frequency values of the first signal;
   b. means for passing lower frequency values of the second signal; and
   c. means for combining the higher frequency values of the first signal and the lower frequency values of the second signal so that when the aircraft is subjected to higher frequency side loads the rudder is moved in a direction to relieve side forces on the vertical stabilizer and so that aircraft directional stability is maintained.

4. The control system as set forth in claim 3 wherein the second signal generating means includes means for generating a signal which is a function of the rate of change of aircraft sideslip angle.

5. The control system as set forth in claim 2 wherein the second signal generating means includes:
   a. means for generating a yaw damping signal for controlling operation of the rudder; and
   b. means for combining the first signal and the second signal and for adding the combined signal to the yaw damping signal to generate the rudder deflection signal.

6. A controller for reducing sideways motion of an aircraft by operation of an aircraft rudder control unit, the controller comprising:
   a. means for sensing, prior to a yawing movement of the aircraft, side forces on a vertical stabilizer on the aircraft; and
   b. means for generating a signal as a function of the side forces so as to command the rudder for movement in a direction which reduces the side forces and which does not reduce a sideslip angle of the aircraft; and
   c. means for feeding the command signal to the rudder control unit so as to cause movement of the rudder.

7. A method for reducing sideways motion of an aircraft by operation of an aircraft rudder, the method comprising the steps of:
   a. sensing, prior to a yawing movement of the aircraft, a sideslip angle of a vertical stabilizer on the aircraft;
   b. generating a command signal as a function of the sideslip angle so as to move the rudder in a direction which reduces the side forces and which does not reduce a sideslip angle of the aircraft; and
   c. responding to the command signal and moving the aircraft rudder to reduce the sideslip angle.

8. A control system for an aircraft having a rudder and a vertical stabilizer, the control system comprising:
   a. means for sensing, prior to a yawing movement of the aircraft, side forces on the vertical stabilizer of the aircraft;
   b. means for generating a signal, as a function of the sensed side forces, for commanding the rudder to move in a relieving direction so as to reduce any lift generated by the vertical stabilizer in response to the side forces, the generating means includes (1) means for generating a first signal as a function of any of the sensed side forces on the vertical stabilizer due to a gust, (2) means for generating a second signal as a function of any of the sensed side forces on the vertical stabilizer due to movement of a control surface of the aircraft, and (3) means for responding to the first signs/and not to the second signal so as to generate a command signal; and
   c. means for moving the aircraft rudder, the rudder moving means including means, responsive to the command signal, for moving the aircraft rudder to reduce the sensed side forces due to the gust.

9. The control system as set forth in claim 8 wherein:
   a. the first signal generating means includes means for passing only higher frequency values of the first signal;
   b. the second signal generating means includes means for passing only lower frequency values of the second signal; and
   c. the responding means includes means for combining the higher frequency values of the first signal and the lower frequency values of the second signal so that the command signal is generated only when the aircraft is subjected to the side forces having the higher frequency values.

10. A control system for an aircraft having a rudder and a vertical stabilizer, the control system comprising:
   a. means for sensing, prior to a yawing movement of the aircraft, side forces on the vertical stabilizer of the aircraft;
   b. means for generating a signal as a function of the sensed side forces so as to command the rudder to move in a direction which does not reduce a sideslip angle of the aircraft and which reduces the side forces; and
   c. means, responsive to the command signal, for moving the aircraft rudder.

* * * * *